United States Patent [19]

Demny

[11] Patent Number: 5,060,786
[45] Date of Patent: Oct. 29, 1991

[54] BELT CONVEYOR FOR A PACKAGING MACHINE

[75] Inventor: Helmut Demny, Gevelsberg, Fed. Rep. of Germany

[73] Assignee: Maschinenfabrik Alfred Schmermund GmbH & Co., Gevelsberg, Fed. Rep. of Germany

[21] Appl. No.: 622,758

[22] Filed: Dec. 5, 1990

[30] Foreign Application Priority Data

Dec. 9, 1989 [DE] Fed. Rep. of Germany ....... 3940791

[51] Int. Cl.$^5$ ............................................ B65G 29/00
[52] U.S. Cl. ................................ 198/803.01; 198/813; 198/832
[58] Field of Search ............... 198/835, 834, 832, 812, 198/813, 803.01

[56] References Cited

U.S. PATENT DOCUMENTS

| 173,038 | 2/1876 | Mitchell | 198/832 X |
| 3,860,107 | 1/1975 | Cioni et al. | 198/803.01 |
| 4,738,354 | 4/1988 | Frei | 198/861.2 |

FOREIGN PATENT DOCUMENTS 0371716 5/1973 U.S.S.R. .............................. 198/331

Primary Examiner—Joseph E. Valenza
Assistant Examiner—Cheryl L. Gastineau
Attorney, Agent, or Firm—Chilton, Alix & Van Kirk

[57] ABSTRACT

A belt conveyor for packaging apparatus includes an endless belt which supports a plurality of spaced article receiving cells, the belt being passed about a pair of direction-changing wheels. Variations in the loading of the endless belt are minimized by coupling the drive shaft, by which power is delivered to a first of the wheels, to a drive shaft for the other wheel via at least one rotationally fixed cardan connection.

12 Claims, 1 Drawing Sheet

U.S. Patent
Oct. 29, 1991
5,060,786
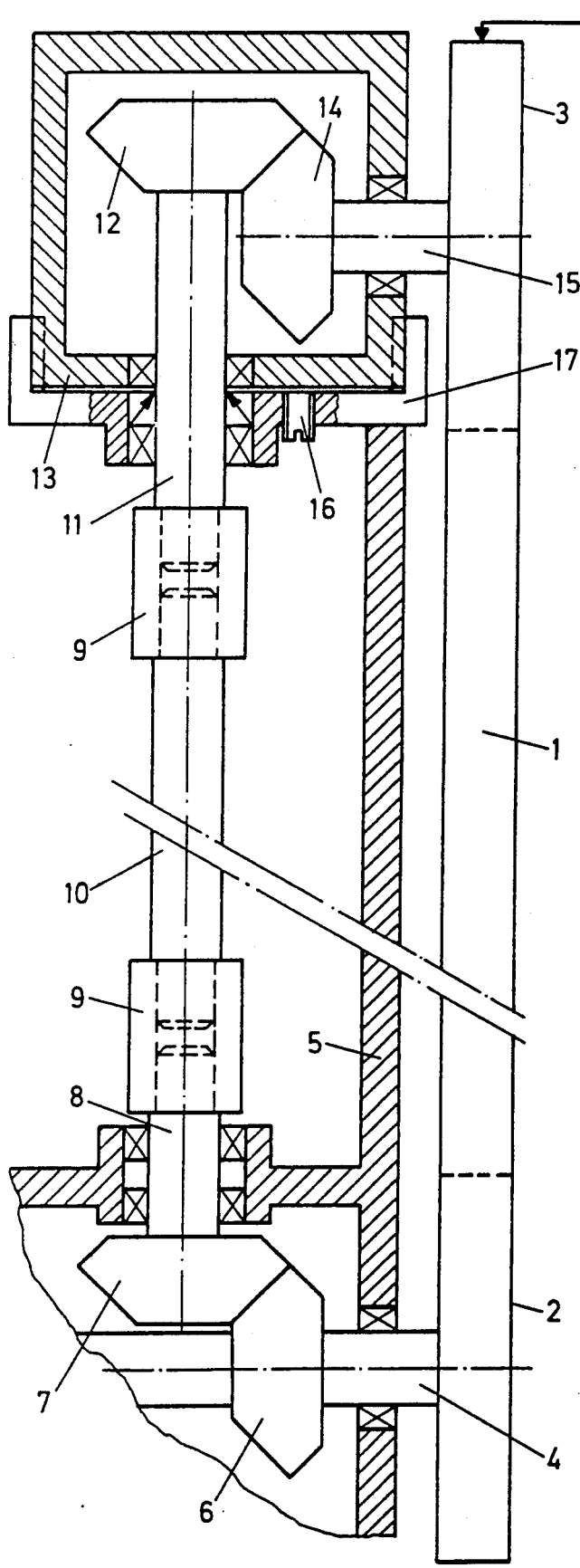
Fig. 1
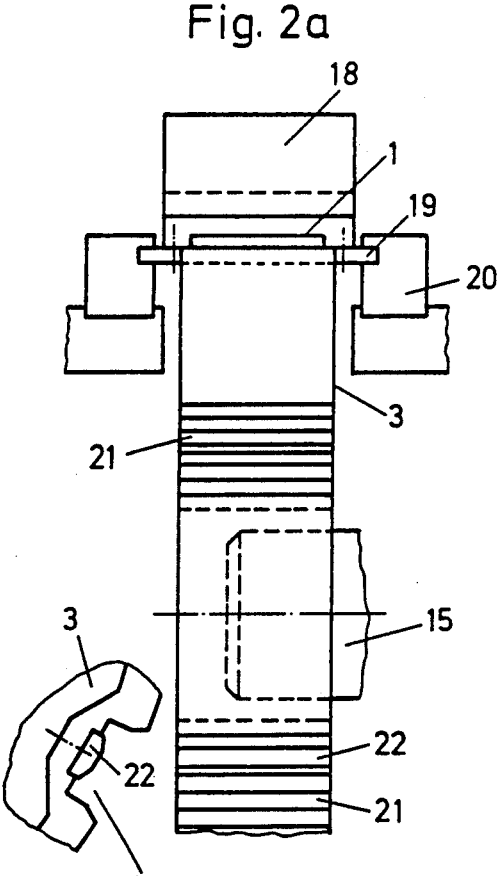
Fig. 2a
Fig. 2b

BELT CONVEYOR FOR A PACKAGING MACHINE

BACKGROUND OF THE INVENTION

1. Field of the Invention

The present invention relates to the transport of articles, for example during a packaging procedure, and particularly to elimination of variations in the loading of endless-belt type conveyors. More specifically, the present invention relates to a belt conveyor and especially to a conveyor for use in a cigarette packaging machine wherein partially wrapped blocks of cigarettes are received in spaced cells or carriers supported on the belt and the belt is guided around a driven wheel and a second spacially displaced wheel. Accordingly, the general objects of the present invention are to provide novel and improved methods and apparatus of such character.

2. Description of the Prior Art

While not limited thereto in its utility, the present invention is particularly well suited for use on cigarette-packaging machines. It is common practice in the cigarette packaging industry to employ belt conveyors which carry equidistantly spaced cells, the cells each defining a cuboid space which receives, for example, a block of cigarettes which has been formed and subsequently wrapped in an inner paper. The belt conveyors on cigarette-packaging machines are typically guided around a pair of wheels which are spaced from one another by a significant distance, one of the wheels being driven and the other being an idler wheel. Since a cigarette packaging process proceeds in step-wise fashion, the driven wheel over which the belt passes is typically energized, via drive shaft, in steps which are commensurate with one or more cell divisions. In some instances, of course, the belt may be driven continuously. In either case, it is common practice, in the region of the upper and/or lower strands of the belt, for the cells to be guided by rails. At the points where the direction of the belt changes, i.e., at the drive and idler wheels, the cells will typically be engaged by recesses provided on the circumference of the wheels.

A problem of long-standing in the art is presented by the fact that the use of a single drive wheel subjects the belt to uneven loading, this being particularly true with respect to the belt tension in front of the drive wheel and to the force applied to the belt downstream of the drive wheel in the direction of transport. With short cycle time and relatively long belt lengths, which are both customary operating conditions on cigarette-packaging machines, the aforementioned variations can have an adverse effect on, for example, the positioning of the cells in the regions where the contents thereof are to be received from or transferred to cooperating conveyors.

SUMMARY OF THE INVENTION

The present invention overcomes the above-briefly discussed and other deficiencies and other disadvantages of the prior art by means of a novel technique which minimizes variations in the loading of a belt conveyor and particularly a conveyor which is advanced in step-wise fashion. The present invention also encompasses a novel and improved endless belt conveyor, having a driven wheel and a displaced second direction-changing wheel, which operates in accordance with the aforementioned novel method.

Apparatus in accordance with the present invention employs means for coupling the drive shaft of the driven wheel to a shaft on which the second wheel is mounted. The coupling means includes at least one rotationally fixed cardan connector. This mode of coupling the driven and second direction-changing wheels of the conveyor ensures that one wheel subjects the upper and lower strands of the belt respectively to a tension and a pressure load, while the other wheel subjects the upper and lower strands of the belt respectively to a pressure and a tension load. Thus, in accordance with the present invention, counteracting or opposed loading of the upper and lower strands of the endless belt is accomplished.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1 is a schematic top view, partially in section, of a belt conveyor for a cigarette packaging machine in accordance with the present invention;

FIG. 2a is a partial end view, partly broken away to show detail, of the apparatus of FIG. 1, the view of FIG. 2a being taken in direction X; and FIG. 2b is a partial front view of the idler wheel 3 of FIGS. 1 and 2a.

DESCRIPTION OF THE DISCLOSED EMBODIMENT

With reference now to the drawings, the endless belt of a belt conveyor in accordance with the disclosed embodiment of the invention is indicated at 1 in FIGS. 1 and 2a. Belt 1 carries receiver cells, such as the cell indicated at 18 at FIG. 2a, which are equidistantly spaced. Belt 1 passes about a pair of spaced conveyor wheels 2 and 3 which reverse the belt direction. Conveyor wheel 2 is directly driven, by a power source not shown, via a drive shaft 4 which is mounted in a gear case 5. A bevel gear 6 is mounted on drive shaft 4 and engages a further bevel gear 7. Bevel gear 7 is mounted on a shaft 8 which, as in the case of shaft 4, is mounted by appropriate bearings in gear case 5. The axes of shafts 4 and 8 are, as may be clearly seen from the drawing, transversely oriented. Shaft 8 is coupled via a sleeve 9 to a cardan shaft 10 which extends parallel to the longitudinal axis of the belt 1. Thus, shafts 8 and 10 are coupled via a cardan connection which is rigid in terms of rotation, inclination and alignment, but is movable as regards to the spacing between shafts 8 and 10.

The cardan shaft 10 is coupled, by means of a further sleeve 9, to an axially aligned shaft 11. The sleeve 9 thus defines a second cardan connection. A bevel gear 12, positioned within a second gear case 13 which is affixed to gear case 5, is mounted on the free end of shaft 11. Bevel gear 12 engages bevel gear 14 which is mounted on a rotatable shaft 15. Shaft 15 extends through the wall of gear case 13. Conveyor wheel 3 is mounted on the end of shaft 15 disposed oppositely with respect to gear 14. The position of gear case 13 is adjustable relative to gear case 5 in the axial direction of the cardan shaft 10 via a set screw 16 or the like in order to adjust the tensioning of belt 1. A guide member 17, affixed to gear case 5, ensures proper orientation of gear case 13, and thus of shafts 11 and 15, during adjustment of the belt tension.

Referring to FIG. 2a, the belt 1 passes through recesses in the bottoms of the cells 18, the recesses facing the drive wheels 2 and 3. The receiver cells 18 are open transversely relative to their direction of transport and on the outside. The cells 18 are clamped to belt 1 by means of base strips 19 which extend generally transversely with respect to the longitudinal axis of the belt. The ends of the base strips 19 are engaged by guide grooves located in lateral guide rails 20 which extend along the upper and lower strands of the belt conveyor. The guide rails 10 have been omitted from FIG. 1 in the interest of facilitating understanding of the invention. The conveyor wheels, on their circumference, are provided with recesses 21 which are arranged to be commensurate with the spacing of the cells 18. The recesses 21 on the conveyor wheels receive, in the fashion of a drive gear, the base strips 19 and thereby transmit driving or retarding force to belt 1. A replaceable wear strip 22 which extends in the axial direction of the drive shafts 4 and 15 is located in the bottom of each of the recesses 21.

While a preferred embodiment has been shown as described, various modifications and substitutions may be made thereto without departing from the spirit and scope of the invention. Accordingly, it is to be understood that the present invention has been described by way of illustration and not limitation.

What is claimed is:

1. In a belt conveyor, the conveyor including an endless belt which supports plural equidistantly spaced receivers for articles to be conveyed, the belt passing about a pair of spatially displaced wheels, a first one of said wheels being driven via a first drive shaft, said first drive shaft being connected to a power source, the improvement comprising:
    a second drive shaft, the other of said wheels being mounted on said second drive shaft; and
    means coupling said first drive shaft to said second drive shaft, said coupling means including at least a first rotationally fixed cardan connection.

2. The apparatus of claim 1 wherein bevel gears are mounted on each of said first and second drive shafts and wherein said cardan connection includes bevel gears which respectively engage the bevel gears on said first and second drive shafts.

3. The apparatus of claim 1 wherein said coupling means comprise a pair of pair of cardan connections disposed at opposite ends of a cardan shaft.

4. The apparatus of claim 3 wherein bevel gears are mounted on each of said first and second drive shafts and wherein said cardan connections each include a bevel gear which engages a bevel gear on a respective of said first and second drive shafts.

5. The apparatus of claim 1 further comprising:
    a base strip for clamping each receiver to the belt, said base strips extending outwardly beyond the longitudinal edges of the belt in a direction generally transverse to the direction of belt movement;
    guide rail means for the conveyor, said guide rail means engaging said base strips at the opposite sides of the belt along a generally linear portion of the transport path defined by the conveyor; and
    recesses in said wheels, said recesses being shaped and spaced to engage said base strips.

6. The apparatus of claim 2 further comprising:
    a base strip for clamping each receiver to the belt, said base strips extending outwardly beyond the longitudinal edges of the belt in a direction generally transverse to the direction of belt movement;
    guide rail means for the conveyor, said guide rail means engaging said base strips at the opposite sides of the belt along a generally linear portion of the transport path defined by the conveyor; and
    recesses in said wheels, said recesses being shaped and spaced to engage said base strips.

7. The apparatus of claim 3 further comprising:
    a base strip for clamping each receiver to the belt, said base strips extending outwardly beyond the longitudinal edges of the belt in a direction generally transverse to the direction of belt movement;
    guide rail means for the conveyor, said guide rail means engaging said base strips at the opposite sides of the belt along a generally linear portion of the transport path defined by the conveyor; and
    recesses in said wheels, said recesses being shaped and spaced to engage said base strips.

8. The apparatus of claim 4 further comprising:
    a base strip for clamping each receiver to the belt, said base strips extending outwardly beyond the longitudinal edges of the belt in a direction generally transverse to the direction of belt movement;
    guide rail means for the conveyor, said guide rail means engaging said base strips at the opposite sides of the belt along a generally linear portion of the transport path defined by the conveyor; and
    recesses in said wheels, said recesses being shaped and spaced to engage said base strips.

9. The apparatus of claim 5 further comprising:
    a replaceable wear strip located at the base of said recesses on said wheels.

10. The apparatus of claim 6 further comprising:
    a replaceable wear strip located at the base of said recesses on said wheels.

11. The apparatus of claim 7 further comprising:
    a replaceable wear strip located at the base of said recesses on said wheels.

12. The apparatus of claim 8 further comprising:
    a replaceable wear strip located at the base of said recesses on said wheels.

* * * * *